Sept. 21, 1965   G. SLAYTER ETAL   3,207,588
GLASS FOAM
Filed March 16, 1962   3 Sheets-Sheet 2

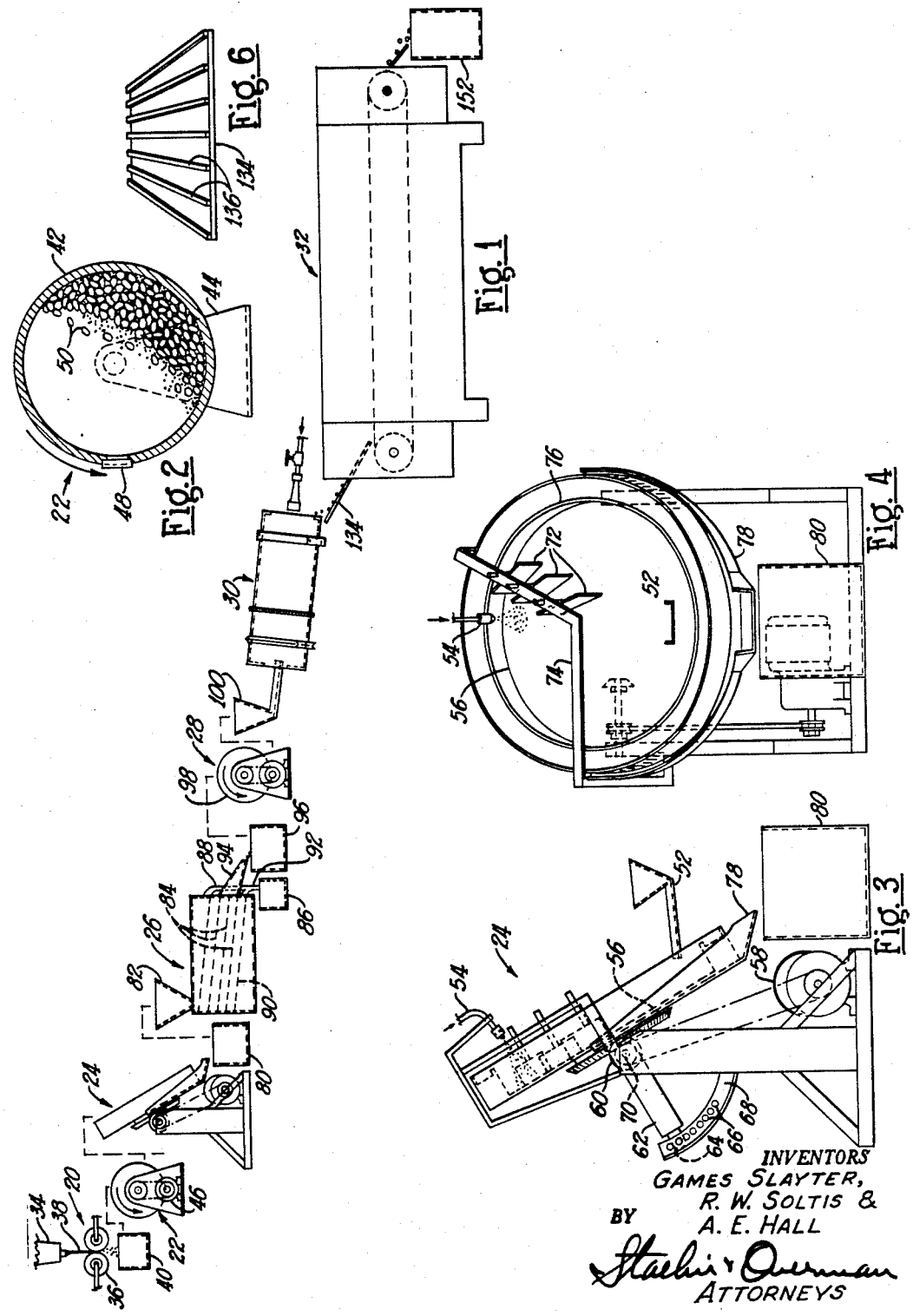

INVENTORS
GAMES SLAYTER,
R. W. SOLTIS &
A. E. HALL
BY
ATTORNEYS

Sept. 21, 1965  G. SLAYTER ETAL  3,207,588
GLASS FOAM

Filed March 16, 1962  3 Sheets-Sheet 3

INVENTORS
GAMES SLAYTER,
R. W. SOLTIS &
BY  A. E. HALL
ATTORNEYS

United States Patent Office 3,207,588
Patented Sept. 21, 1965

3,207,588
GLASS FOAM
Games Slayter, Newark, and Roger W. Soltis, Granville, Ohio, and Andrew E. Hall, Statesville, N.C., assignors to Owens-Corning Fiberglas Corporation, Toledo, Ohio, a corporation of Delaware
Filed Mar. 16, 1962, Ser. No. 180,126
18 Claims. (Cl. 65—21)

This invention relates to glass foam and particularly to glass foam having finer and more uniform cells than previously known glass foams.

Many types of foams, both organic and inorganic in nature, are known in the art, as well as many foam compositions and methods for making foams. Insofar as is known, however, glass foams which have heretofore been made on a commercial scale have relatively large or non-uniform cells. The non-uniformity of the cells detracts from the apearance thereof and, even where appearance is not important, the non-uniformity often produces weak regions and other erratic characteristics. Foam with larger cells, particularly when of an inorganic nature, tends to be more friable and also tends to have lower insulating effectiveness than foam with finer cells.

The present invention relates to the production of glass foam which has finer and more uniform cells than foams heretofore known. The foam can be produced with either closed or open cells with varying degrees therebetween and can also be made in controlled density ranges. While uniform, fine-celled foam according to the invention can be made in massive form, such as slabs, plates, or other bodies, the foam preferably is made in the form of small pellets, particularly because little or no time consuming and expensive annealing is required for the pellets. The light weight foam pellets can be combined with any of a variety of binders, if desired, to produce a massive body of almost any shape. In many instances the massive body cannot be made from the foam alone. Further, many desired characteristics can be achieved in a body but using particular binders to produce such properties as resiliency, high insulating value, strength, high temperature resistance, low cost, light weight, and toughness. The glass foam pellets can be combined with many types of binders, including asphalt, gypsum, cement, many plastic materials, and perlite. In the cement-pellet combination, an effective combination can be attained if the pellets are first given a latex coating. Most of the above binders can be used either in a non-cellular condition or in the form of a foam to produce an even lighter body than is otherwise obtainable. The combinations of pellets and binders have been found to be specifically useful in the production of cold storage floors, fire door cores, roof panels, heat shields for missiles, and fire resistant acoustical tiles. Before the binders are added, the pellets can be partially crushed so as to constitute a larger proportion, by weight, of the resulting composite body. After the pellets are crushed against one another, they should not be moved before the binder is added or the crushed surfaces will be exposed and some of the binder will be absorbed, resulting in a heavier composite body. The pellets can also be used by themselves as light weight aggregate and as a pourable insulation, being particularly effective for high temperature insulation if first coated with a reflective material such as aluminum. The pellets can also be encased in a bag of polyethylene or other suitable plastic material for use as insulation. A sheet of waterproof material can also be used to cover a layer of the pellets, and concrete then poured thereover for a floor for cold storage lockers and the like.

The specific batch employed in the production of the glass foam pellets is of particular importance to the achievement of finer, uniform cells. The batch includes two blowing agents which react and give off gas in different temperature ranges so that the blowing agents are effective over a wider range of temperatures than is otherwise possible. The batch also includes aluminum of a particular physical form and fineness which also is instrumental in the achievement of the fine cells.

After the batch is ground and mixed, it is formed into pellets which are then heat-treated at particular temperatures and for particular periods of time to produce foam of particular densities and with predominantly closed or open cells. Thus, glass foams of particular characteristics can be produced for particular job applications. For example, open-cell foam is desirable for acoustical purposes while closed-cell foam is particularly desirable for insulating purposes. From a density standpoint, heavier but stronger foams may be desirable for roof panels whereas lighter foams may be desirable for missile heat shields, for example.

It is, therefore, a principal object of the invention to provide glass foam having finer and more uniform cells therethrough.

Another object of the invention is to provide glass foam pellets which are light weight, strong, and good insulators.

Still another object of the invention is to provide glass foam pellets of controlled weight and cell characteristics for particular uses and which can be combined with many types of binders for many applications.

Still a further object of the invention is to provide an improved foam batch for making a glass foam having fine, uniform cells.

Other objects and advantages of the invention will be apparent from the following detailed description of preferred embodiments thereof, reference being made to the accompanying drawings, in which:

FIG. 1 is a schematic view in elevation of apparatus according to the invention for producing glass foam in the form of pellets, the various units of the apparatus being arranged in a manner to show the steps involved in the foam pellet process;

FIG. 2 is an enlarged view in vertical cross section taken laterally through a ball mill unit shown in FIG. 1;

FIG. 3 is an enlarged side view in elevation of a pelletizing unit shown in FIG. 1;

FIG. 4 is a front view in elevation of the pelletizing unit of FIG. 3;

FIG. 6 is a front view in elevation of a discharge chute for the pre-heater shown in FIGS. 1 and 5;

Figure 5:
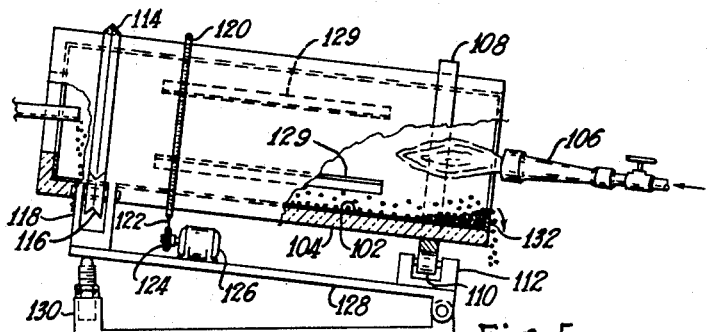
FIG. 5 is an enlarged, side view in elevation, with parts broken away and with parts in cross section, of a pre-heating unit shown in FIG. 1.

All references herein to screen sizes are to the U.S. Sieve Series.

Unless otherwise noted, all proportions, percentages, and parts referred to herein and the claims are on the basis of weight and not volume.

The particular batch employed in making the fine-celled, uniform foam according to the invention is very important and the high quality foam probably could not be obtained from a different batch, regardless of the process employed. The preferred batch used in making the foam includes powdered glass or cullet, aluminum in flake form, calcium sulphate, barium sulphate, and a binder. In a specific embodiment, the batch includes 100 parts of the glass cullet, 0.5 parts of the flake aluminum, 1.5 parts of the calcium sulphate in the form of gypsum, 4 parts of the barium sulphate in the form of barytes, and 0.5 part of carboxymethyl cellulose. The gypsum used in the batch is almost entirely calcium sulphate and the barytes is approximately 85–90% barium sulphate. These forms of the calcium and barium sulphates are used simply because they are readily commercially available and are relatively inexpensive.

The use of both of the foaming or blowing agents calcium sulphate and barium sulphate in the foam batch is important in at least two respects. By employing both of these blowing agents, the range of temperatures in which gas which forms the foam cells or bubbles is given off is broadened, so that the heat treatment is not as critical as it would be with the use of only one of the two blowing agents. In addition, each of these blowing agents imparts particular characteristics to the resulting foam product, which characteristics could not be attained with either of the agents alone. The barytes or barium sulphate tends to produce finer bubbles in the foam while the gypsum or calcium sulphate tends to make the foam lighter and the amount thereof can be varied to some extent to control density. Thus, the combination of the calcium sulphate and barium sulphate in the foam batch appears to be very important to the attainment of the high quality of the foam. Satisfactory foam has been produced with from 0.1 to 8 parts of calcium sulphate and from 1 to 11 parts of barium sulphate per 100 parts of glass.

The aluminum in its flake form is also an important ingredient in the foam batch and is essential to the achievement of a fine-celled, uniform foam. The aluminum produces a significant exothermic reaction but the exact reason for the importance of the flake form is not known. However, it is believed that it enables a faster reaction to take place than is otherwise possible and, in any event, foam made with even the finest aluminum powder is much coarser and unsuitable for many applications. The best foam has been attained with aluminum known as Alcoa No. 422, 100% of which passes through a 325 mesh sieve and is known as nominal 400 mesh. Another aluminum substantially as good as the No. 422 is Alcoa No. 408, 99.5% of which passes through a 325 mesh sieve. Still another flake aluminum, No. 322, produces foam which is satisfactory for many applications although not as uniform as the foam made with the No. 422 or the No. 408 aluminum. When spread on a water surface, one gram of the No. 422 aluminum will cover 29,000 square centimeters; one gram of the No. 408 aluminum will cover 17,000 square centimeters; and one gram of the No. 322 aluminum will cover 10,000 square centimeters. It will be appreciated, therefore, that the efficacy of flake aluminum for producing a foam according to the invention can be measured in terms of extent of spreading on water. Good foam can be attained with flake aluminum one gram of which will cover at least 17,000 square centimeters of water; foam which will be satisfactory for many purposes can be attained with flake aluminum, one gram of which will cover at least 10,000 square centimeters of water. Good foam has been produced with a batch having an aluminum content from 0.1 to 5 parts per 100 parts of glass and satisfactory foam has been produced with an aluminum content from 0.1 to 10 parts of glass. The aluminum can be used in an amount up to 25 parts without seriously affecting foam quality; however, no significant change is attained with more than 10 parts of flake aluminum.

The glass employed in the foam batch must be one which has, within the temperature range in which the blowing agents and aluminum react or take effect, a viscosity such that the gas given off by the blowing agents will produce bubbles in the glass. If the glass is too viscous within the temperature range, no bubbles at all will be formed, whereas if the glass is too fluid, bubbles will form but will collapse shortly thereafter. It has been found that glass with a viscosity between 1000 and 2 million poises at a temperature between 1750° F. and 2050° F. is capable of producing foam which is satisfactory for many applications. This is also true of a glass which has a viscosity between 40,000 and 2 million poises at 1750° F. and between 1000 and 3000 poises at 2050° F. A glass with a viscosity between 10,000 and 500,000 poises at a temperature between 1750° F. and 2050° F. is capable of producing good foam. Generally, the foam will be more dense, although not different in uniformity at higher viscosities and lower temperatures.

In a specific embodiment, the glass used in the foam batch includes 54% $SiO_2$, 14% $Al_2O_3$, 17.5 CaO, 4.5% MgO, and 10% $B_2O_3$. The viscosity of this glass is approximately as follows: 1,780,000 poises at 1750° F., 220,000 poises at 1850° F., 34,000 poises at 1950° F. and 2400 poises at 2050° F. The foam is equally satisfactory when the glass includes 52–56% $SiO_2$, 12–16% $Al_2O_3$, 16–19% CaO, 3–6% MgO, and 9–11% $B_2O_3$. Another glass which provides substantially the same quality foam includes 53.5% $SiO_2$, 14.2% $Al_2O_3$, 16.6% CaO, 4.5% MgO, 6.9% $B_2O_3$, 0.7% $Fe_2O_3$, 2.8% MnO, 0.8% $TiO_2$, 1.0% fluorides, and 1.4% other oxides. An additional glass which produces satisfactory foam for many applications, but foam which is not as uniform as those produced with the previously discussed glasses, includes 62–65% $SiO_2$, 3.75–4.5% $Al_2O_3$, 13.5–14.7% CaO, 2.8–3.5% MgO, 4.75–6.25% $B_2O_3$, 0.19–0.32% $Fe_2O_3$, 7.5–8.8% $Na_2O$, and 0.3–1.5% $K_2O$. The viscosity of a particular glass within this composition range was found to be as follows: 45,000 poises at 1750° F., 8900 poises at 1850° F., 2220 poises at 1950° F. and 1260 poises at 2050° F. CaO, $B_2O_3$, and alkali metal oxides are fluxes in the foregoing compositions. Their function is to lower the vitrification temperature and to control high temperature viscosity. In general a glass will produce a satisfactory foam for many applications if it contains from 40–75% $SiO_2$, 0–20% $Al_2O_3$, 0–20% $Al_2O_3$, 0–10% MgO, and sufficient fluxes to control the vitrification temperature and to provide the required high temperature viscosity characteristics.

Many other binders, such as sodium alginate, can be used in place of the carboxymethyl cellulose. Amounts of the binder from 0.5% to 2.5% are satisfactory.

As to the proportions of the various ingredients, it has been found that good foam can be produced using 100 parts of glass with 0.1 to 5 parts of flake aluminum, 2 to 6 parts of barytes, and 1 to 3 parts of gypsum. Satisfactory foam for many purposes has been made of 100 parts of glass, 0.1 to 10 parts of flake aluminum, 1 to 11 of barytes, and 0.1 to 8 parts of gypsum.

What is good foam and what is satisfactory foam are difficult to define. For present purposes, however, foam is regarded as good if the vast majority of the cells cannot be readily distinguished by the naked eye and if no more than 3% of the area of a cross-sectional surface through a pellet or body of the foam will be of cells which exceed about 1/64 inch in diameter. Foam is satisfactory if most of the cells cannot be readily distinguished by the naked eye and if no more than about 10% of the area of a cross-sectional surface through a pellet or body of the foam will be of cells which exceed about 1/64 inch in diameter.

In a specific embodiment, the preferred batch described above and a binder were ground and mixed until at least 90% of the particles passed through a 170 mesh sieve. The mixture was then mixed with water to form a moldable compound and made into pellets having an average diameter of 3/16" in a range of 1/64" to 1/4". The pellets were then coated with talc and heated to a temperature of 1900° F. for one minute. The resulting foamed pellets had closed cells and an apparent density of 7.5 pounds per cubic foot.

An exothermic reaction might also be attained with additional ingredients in the batch. For example, iron oxide might be added to the batch for exothermic reaction with the blowing agents to produce internal heat.

A devitrifying agent such as alumina, titania (preferably as rutile), zircon, or zirconia in an amount preferably of about 5% but up to 15% can also be added to the batch. The resulting foam is devitrified, making it more highly refractory, and it also has greater infrared opacity, rendering it a more effective insulator at high temperatures.

The overall steps involved in the production of glass foam according to the invention, and particularly glass foam pellets, will first be set forth in connection with the apparatus of FIG. 1. Subsequently, the individual units of the apparatus and then some modifications will be discussed in detail.

Referring to FIG. 1, glass foam cullet used in the batch is produced by a crushing unit 20 and the cullet and other ingredients are then mixed and ground simultaneously for several hours in a ball mill 22 to a predetermined small size. The mixing and grinding time is important to assure that thorough mixing and sufficient fineness are attained. Otherwise, the resulting foam will not be as uniform and may contain some relatively large cells or bubbles as well as areas of varying density.

The ground and mixed batch is then placed in a pelletizing unit 24, along with water, to form small foam batch pellets. These pellets are then screened in a sorting unit 26 to sort them into predetermined sizes with the excessively large and excessively small size pellets being returned to the pelletizing unit 24.

Pellets in a predetermined size range are then fed to a coating unit 28 by means of which the individual pellets are coated with talc or a similar substance to prevent subsequent sticking, either to other pellets or to other surfaces with which they come into contact. The coated pellets are then fed through a pre-heating unit or furnace 30 in which the pellets are heated to a predetermined temperature below that at which they foam. Finally, the pellets from the pre-heater 30 are fed to a foaming unit or furnace 32 in which the pellets are heated to and maintained at a foaming temperature long enough to cause the pellets to foam.

The foaming temperature can be controlled to produce foamed pellets with varying densities and characteristics. In general, if the temperature is low or if the pellets are maintained at the temperature for a short period of time, the resulting foam pellets will have a higher density than otherwise. The higher the temperature or the longer the foam is at a given temperature within the foaming range, the lighter will be the pellets. While the foam ordinarily has closed cells, if subjected to a temperature in the foaming range for a longer period, an open-celled foam will result, which is particulary useful for specific applications such as acoustical tile. The cells in existing foam can even be opened by subsequent heat treatment. For example, the cells of foam produced at 1900° F. can be opened by subsequent heating to 1800° F. for five minutes.

The specific units of the apparatus of FIG. 1 will now be discussed. The crushing unit 20 includes a suitable glass melter 34 below which is a pair of water-cooled crushing rolls 36 which receive, cool and crush a stream 38 of molten glass from the melter 34. The resulting cullet is then caught in a receptacle 40. The cullet size is not critical and need only be sufficiently small that it can be ground and mixed relatively easily with the other batch ingredients. In practice, the glass is crushed to a size such that the particles can pass through a 14 mesh screen. Where glass used in fiber-forming operations is suitable for use in the glass foam batch, it is even possible to use the glass fiber scrap in the batch. Where such scrap contains detrimental binders, it should first be heat-cleaned to eliminate them.

The glass cullet or particles are then placed in the ball mill 22 along with the other foam batch ingredients in powder form. Referring to FIG. 2, the ball mill 22 includes a rotatable cylindrical container or drum 42 rotatably mounted on supports 44 and driven at one end by a motor 46 (FIG. 1). The cylindrical container 42 has an access door 48 through which the batch ingredients are placed along with a plurality of hard, rounded bodies 50 which can be made of any of a number of suitable materials, flint being a satisfactory one. As the cylindrical drum 42 is rotated, the batch ingredients and the bodies 50 rotate and tumble therein to cause the batch ingredients to be both mixed and ground.

It is important that the ball mill be operated for a sufficiently long period of time to assure that the ingredients are properly and thoroughly mixed and that the particles are sufficiently small to provide uniformity of the ingredients throughout the batch. When this point is reached, in approximately 4 hours, further grinding and mixing is superfluous and only adds to the cost and time of the operation. In practice, at least 75% of the batch should pass through a 170 mesh screen for good, uniform foam to be produced. However, satisfactory foam will be produced if 60% of the batch passes through a 170 mesh screen. More specifically, satisfactory foam was produced when the batch was ground and mixed until 25% of it was retained on a 140 mesh screen, 14% was retained on a 170 mesh screen, 4% was retained on a 200 mesh screen, 16% was retained on a 230 mesh screen, 7% was retained on a 270 mesh screen, 17% was retained on a 325 mesh screen, and 15% passed through a 325 mesh screen.

The ground and mixed batch is then removed from the drum 42 and supplied to a suitable hopper 52 (FIG. 3) from which it is added to the pelletizing unit 24. Water, in an amount of about 15–20% by weight of the batch, is also added to the pelletizing unit 24 through a suitable nozzle 54. The batch and water are mixed together on a slanted, rotating table 56 which is driven by a motor 58 through suitable bevel gears 60. The table 56 is affixed to an axle which is rotatably mounted in a sleeve 62, the angle of which can be changed by inserting an end portion 64 thereof in different holes 66 in an arcuate arm 68. As the angle of the sleeve 62 is changed, the angle of the table is also changed with it being pivoted about a horizontal axis 70. The water and the batch on the table 56 are mixed more thoroughly with the aid of vanes 72 mounted adjacent the table 56 by a supporting arm 74. As the batch and water mix, the batch rolls into pellets which, when in a predetermined size range, roll over a lip 76 of the table 56 and into a trough 78 from which they fall into a suitable receptacle 80.

The size of the pellets obtained with the pelletizing unit 24 depends upon the angle at which the table 56 is positioned, its speed of rotation, the amount of water employed, the point at which the water is introduced to the table 56 through the spray 54, and the point at which the batch is introduced to the table 56 from the hopper 52. The proper locations and angles can more easily be determined experimentally than by any other means. By way of example, pellets ranging from 3 to 10 mesh, with the majority between 5 and 7 mesh, have been obtained with the batch and the water supplied from the positions shown, with the water being 15% by weight, and with the table 56 at an angle of 55°, and rotated at a speed of 15 r.p.m.

The pellets from the unit 24 are within a particular size range which will produce foam pellets within a given range. Where a more narrow size range is desired for a particular purpose, the pellets are placed in a hopper 82 of the screening unit 26 in which they roll down and drop through a plurality of graduated, slanted screens 84 which separate the pellets into several narrower size ranges. The upper screen 84 retains the largest pellets, which, if too large for any use, can be collected in a receptacle 86 by means of a discharge tube 88, broken up, and then recharged to the pelletizing unit 24. Similarly, the smallest pellets, if too small for any use, can be collected on a slanted bottom wall 90 and also discharged into a receptacle 86, this time through a discharge tube 92, for recharging to the pelletizing unit 24. The intermediate screens 84 collect pellets within narrower size ranges and discharge them through chutes 94 from which they are collected in receptacles 96. Depending on the desired ultimate size of the foam pellets, the batch pellets caught on the three intermediate screens can be collected in a single hopper or can be collected in three hoppers, one for each of the screens. In general, batch pellets ranging between 1/64" and 1/4" are satisfactory. Pellets larger than approximately 1/4" in diameter require annealing and pellets under approximately 1/64" tend to be excessively heavy, having a comparatively large surface or skin to volume ratio. The skin tends to be more dense than the interior of the pellets because a glaze tends to form thereon during heat treatment.

Pellets of proper size are then supplied from the receptacle 96 into a rotary drum 98 of the coating unit 28 which can be similar in design to the ball mill unit 22. In addition, many other types of coating units can be employed. A separating agent such as talc is then placed in the drum 98 with the pellets to cause the pellets to be coated therewith as the drum is rotated. This coating on the pellets prevents them from sticking together during subsequent heating steps and also prevents them from sticking to other surfaces such as the furnace conveyor.

The coated pellets are then placed in a charge hopper and trough 100 and fed to the pre-heating unit 30. This can be accomplished by vibrating the hopper and trough 100 or by any other suitable means. The pre-heating unit 30 includes a cylindrical metal casing 102 (FIG. 5) which is about 10" in diameter and 6' long. Most of the casing is covered by a thick insulating layer 104 to retain heat therein supplied by a suitable burner 106 located at the discharge end of the unit and firing thereinto. The casing 102 is supported at one end by a heavy ring 108 having a flat periphery which is contacted by a supporting roller 110 rotatably held by a first yoke 112. The other end of the unit has a ring 114 with a V-shaped periphery which is engaged by grooved rollers 116 rotatably supported by a second yoke 118. The cooperation between the ring 114 and the grooved rollers prevents longitudinal movement of the casing 102, yet the opposite end, supported by the flat ring 108 and flat roller 110, can expand relative to the first end when heated, with the ring 108 simply sliding laterally on the rollers 110. The casing 102 is rotated by means of a large sprocket 120 therearound which is connected to the casing 102 by means of only several spaced fingers which minimize the transfer of heat from the casing to the sprocket yet provide driving engagement between them. The sprocket 120 is driven through a chain 122 and a drive sprocket 124 driven by a suitable variable speed motor 126. The drive sprocket 120, being close to the V-shaped ring 114, changes very little in position when the casing 102 is heated so as not to seriously affect the alignment between the sprocket 120 and the drive sprocket 124.

The entire casing 102 and the yokes 112 and 118 are supported on a slanted platform 128, along with the motor 126. One end of the platform 128 can be raised and lowered, as by means of a suitable screw or jack 130, to change the angle of the casing 102 and thereby vary the amount of time required for the pellets to pass through the casing 102 during rotation thereof.

The casing 102 can have roll bars 129 affixed therein longitudinally, if desired. These engage the pellets more fully and cause them to spread out to a greater extent over the lower portion of the casing 102.

In operation, the pellets are supplied to the upper end of the casing 102 from the hopper 100 and gradually roll and slide down the casing 102 as it is rotated. When the pellets reach the lower end, they are retained temporarily by a lip 132 to assure that they are completely heated. The pellets are pre-heated to a temperature of approximately 1500° F., below the temperature at which they tend to become sticky or to foam.

Figure 7:
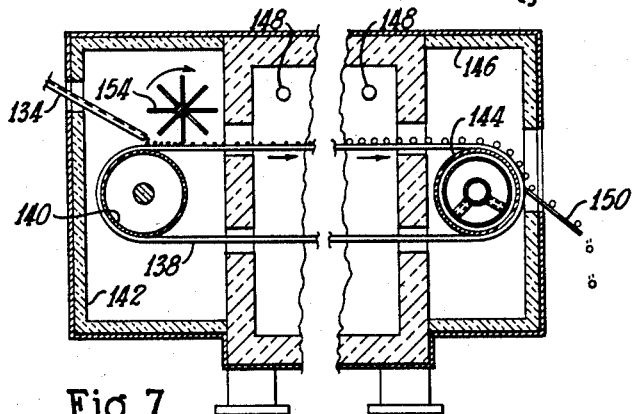
FIG. 7 is an enlarged, fragmentary view in vertical cross section of a foaming furnace shown in FIG. 1.

After pre-heating, the pellets are discharged down a distributing chute 134 and into the foaming furnace unit 32. As shown in FIG. 6, the distributing chute 134 includes a plurality of diverging ridges 136 which spread the pellets over the width of a conveyor belt 138 located in the furnace 32 (FIG. 7). The belt 138 extends around an idler roll 140 located in a charge zone 142 and around a drive roller 144 in a discharge zone 146. The belt 138 moves in the direction of the arrows when driven by a suitable motor (not shown). As the batch pellets are carried through the furnace 32, they are heated to a foaming temperature by suitable burners 148, and, after, foaming, are annealed for a short time at the discharge end of the furnace. In practice, the pellets are heated to a foaming temperature between 1750 and 2050–2100° F. for a period of 1/2 to 2 1/2 minutes with the higher temperatures and the longer periods of time resulting in foam pellets of lighter weight or density. If the pellets are held too long at the higher temperatures, the bubbles formed will collapse, resulting in a glassy, unfoamed substance. They are then discharged from the belt 138 down a slanted plate 150 and into a receptacle 152 (FIG. 1). The pellets either fall off the belt 138 by themselves or are scraped off by the upper edge of the plate 150 which contacts the belt near its rearward extremity.

A distributing wheel 154 is located near the charge end of the belt 138 and is rotated in a clockwise direction by suitable means outside the furnace, so that the lower ends of the fingers move in a direction opposite to the upper run of the belt 138. This limits the roll of the batch pellets down the chute 134 and also spreads them into rows as the wheel 154 rotates.

While increased production can be attained by the serial arrangement of the pre-heating unit 30 and the furnace unit 32, the pre-heating unit 30 can be used by itself as a foaming furnace by employing more heat to raise the temperature within the unit 30 to a point in the foaming temperature range. The pellets reach the foaming temperature at an intermediate portion of the casing 102 and are foamed before they reach the end, the pellets being partially annealed near the lower end of the casing 102, generally between the ring 108 and the lip 132. The use of the pre-heating unit 30 as a foaming unit has the advantage that the pellets continue to roll during the foaming thereof so that they assume a more truly spherical shape than is possible in the foaming furnace 32.

When the unit 30 serves as a foaming furnace, the pellets must be thoroughly coated with talc or other releasing agent since they are in frequent contact with each other and with the casing 102 during their travel therethrough. Hence, it is desirable to feed talc through the unit 30 when the pellets are foamed therein by adding the talc or agent along with the pellets through the hopper 100.

Figure 8:
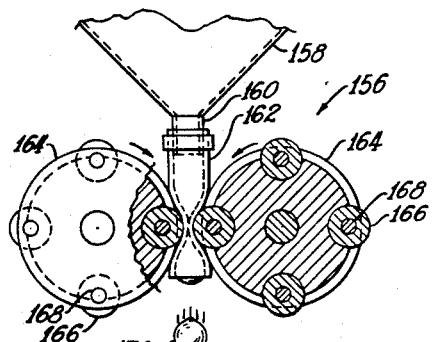
FIG. 8 is a side view in elevation, with parts broken away and with parts in cross section, of a modified pelletizing unit for producing batch pellets.

A modified unit for making pellets from the glass foam batch is illustrated in FIG. 8. This unit, indicated at 156, includes a hopper 158 into which glass foam batch and water are placed. The hopper has an exit neck 160 to which is attached a flexible tube 162 which extends downwardly between a pair of rotatable squeeze rollers 164. The rollers 164 are rotated in opposite directions by a suitable drive (not shown) and include spaced pinch tubes 166 which are rotatably mounted on the rollers 164 by pins 168. The rollers 164 are synchronized so that the pinch tubes 166 move together to contact and squeeze the tube 162 simultaneously as the rollers rotate. As the supply tube 162 is squeezed, it moves the wet batch downwardly and causes a portion of it to be pushed out in a generally spherical pellet 170. The pellet has a circular horizontal cross section because of the circular cross section of the supply tube 162 and also has tapered ends due to the squeezing and converging action of the pinch tubes 166. While the pellet 170 is not perfectly round, it is sufficiently so for most purposes. The pellet 170 tends to assume more of a spherical shape after foaming.

Figure 9:
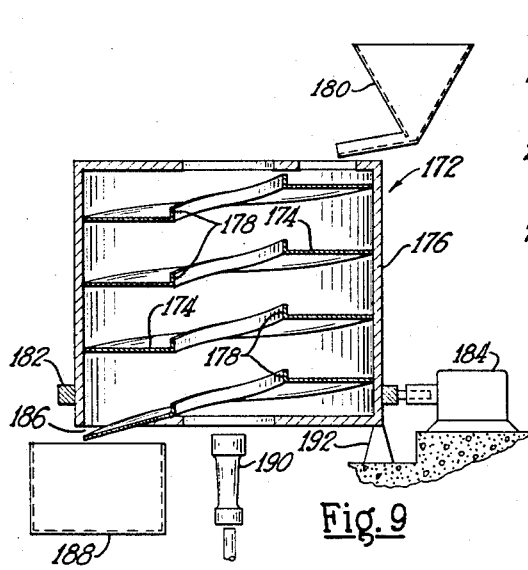
FIG. 9 is a view in vertical cross section of a modified furnace for foaming pellets.

A modified foaming furnace unit 172 is shown in FIG. 9. The furnace 172 is similar in many respects to the pre-heating unit 30 when used as a foaming furnace, the basic difference being that the furnace 172 is mounted vertically and has a helical conveyor or hearth 174 therein. The conveyor is affixed to the inner surface of a vertical cylindrical casing 176 and has a short inner lip 178 to retain the pellets thereon. The pellets are supplied to the upper end of the helical conveyor 174 from a suitable hopper 180 and move down the conveyor 174 by vibration thereof, which can be effected through a heavy ring 182, which is attached to the casing 176 and is set in vibratory motion by a vibrator 184. A portion of the lower end of the conveyor 174 is slanted outwardly and is separated from the casing 176 to provide a discharge opening 186 through which the pellets are discharged into a suitable receptacle 188. A suitable burner 190 is located below the casing 176 and directs heated products of combustion upwardly through the central opening formed by the conveyor 174. The casing 176 can be supported on any suitable legs 192.

If desired, the pellets can be made to move upwardly on the conveyor 174 and through the casing 176 by causing it to oscillate in a pivotal manner about a vertical axis, as is known in the art. The pellets would then be fed to the bottom and discharged from the top.

Figure 10:
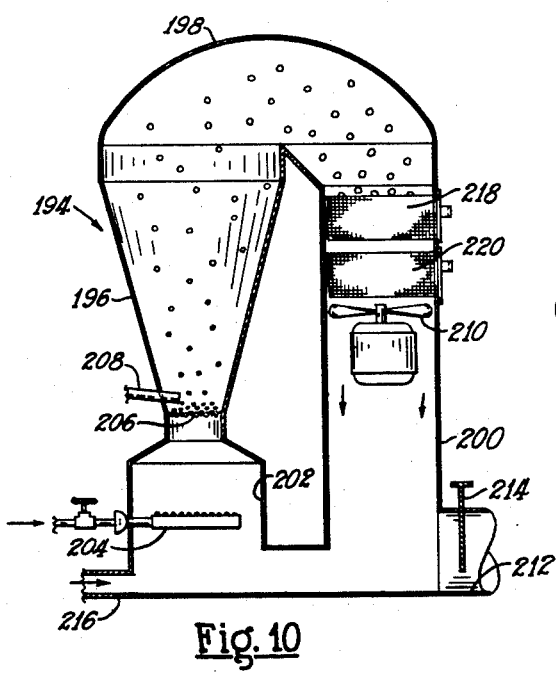
FIG. 10 is a view in vertical cross section of another modified furnace for foaming pellets.

A further modified furnace is shown in FIG. 10 and is indicated generally at 194. The furnace 194 includes a vertical foaming duct 196 which diverges slightly in an upward direction, a return bend 198, and a discharge duct 200. A combustion chamber 202 is located below the vertical passage 196 and contains a suitable burner 204 which, in this instance, is of the atmospheric type, utilizing both primary and secondary air. A fine screen 206 forms a perforate hearth above the burner 204 and batch pellets are supplied to this hearth from a suitable trough 208. Combustion products and air are circulated upwardly through the foaming duct 196 and downwardly through the discharge duct 200 by means of a suitable blower 210. Some of the gases pass outwardly through an exit passage 212 controlled by a damper 214 while some of the heated gases are recirculated. Secondary combustion air is drawn through an inlet passage 216 located near the bottom of the combustion chamber 202 and passes upwardly through the duct 196 with the recirculated air. The relative amounts of heated combustion products discharged and the amount of fresh air drawn through the inlet 216 is determined by the position of the damper 214. Preferably, only enough air is drawn through the inlet 216 to support and complete combustion of the fuel issuing from the burner 204 so that as much heated gas can be recirculated and reused as possible.

The batch pellets that are deposited on the perforate hearth 206 are heated by the burner 204 and, when foamed and of a desired density, provide sufficient resistance to the air and combustion products passing upwardly through the duct 196 that they are blown upwardly and carried through the return bend 198 and into a perforate receptacle 218 or 220 located in the discharge duct 200 above the blower 210. The receptacles 218 and 220 can be removed one at a time so that one always remains to catch the foamed pellets while the other is being emptied. If desired, a plurality of the mesh receptacles can be employed and can be graduated so as to catch the pellets in various sizes, thus providing an automatic sorter.

Figure 11:
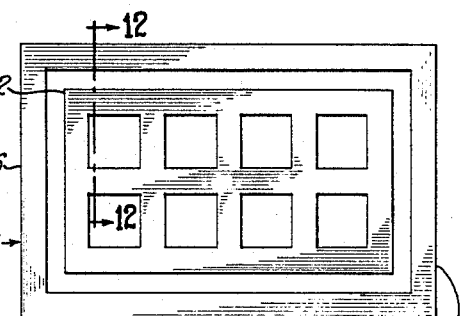
FIG. 11 is a top view of a mold, with the lid removed, for foaming a specially shaped body of glass foam batch into a glass foam slab.
Figure 12:
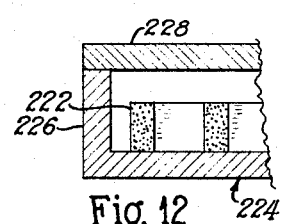
FIG. 12 is a view in cross section taken along the line 12—12 of FIG. 11 with a lid placed on the mold.
Figure 13:
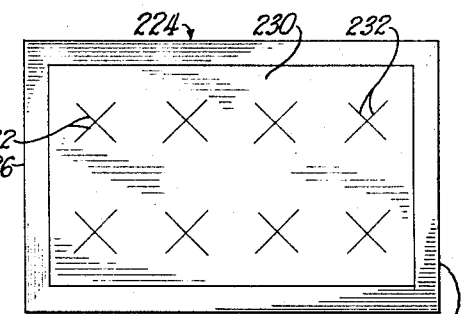
FIG. 13 is a plan view similar to FIG. 11 showing the body foamed in the mold.

While the foam has many advantages when used in pellet form, it can also be made in the form of massive bodies such as slabs. The slabs require annealing after foaming to achieve reasonable strength and, the foam being a good insulator, the annealing requires a considerable length of time. This increases the cost of the foam, requiring costly installations and considerable floor space. For this reason, the foam is preferably made in pellet form where possible. It has been found in the production of foam slabs that if the foam batch is simply placed in a mold in an even layer, for example, or in many other random or carefully determined positions, it will form creases, large bubbles, and folds which render the resulting bodies substantially unusable, at least without the removal of substantial portions of the outer surfaces thereof to a depth of ½″ or more, depending in part on the thickness of the overall slab. However, it has been found that uniform and smooth slabs can be attained with the batch shaped as a grid 222, as shown in FIGS. 11–13. The batch grid 222, which can be extruded and sliced to the proper thickness, is carefully proportioned and is centered in a mold 224 of graphite or other suitable material having side walls 226 and a lid 228. With proper spacing, when foaming occurs, the grid completely fills the mold 224 without causing the usual problems discussed above and the resulting slab, indicated at 230 in FIG. 13, is substantially uniform throughout and has smooth surfaces. Only light joint lines 232 are visible at some of the junctions where the batch comes together.

Figure 14:
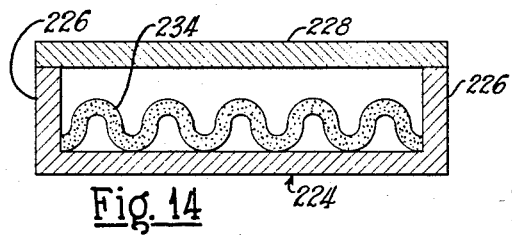
FIG. 14 is a view in vertical cross section of a mold for producing glass foam slabs from a modified body of glass foam batch.
Figure 15:
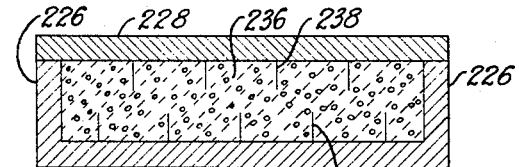
FIG. 15 is a view similar to FIG. 14 showing foamed batch in the mold.

Another arrangement for the foam batch in making slabs is shown in FIGS. 14 and 15. In this instance, the batch is shaped in the form of a corrugation 234 which may be slightly thicker in some portions than others to cause proper filling of the voids. The corrugation can be formed by extruding the batch mixed with water or by placing the batch with water on a suitable form and removing the form after the batch is dried sufficiently to remain intact. In any case, the corrugation is cut to a length approximately two-thirds of the width of the mold. The batch corrugation 234 is then placed in the mold 224 or other suitable mold and foamed to produce a slab 236, as shown in FIG. 15, which has junction lines 238 formed at the meeting lines of the batch corrugations during foaming. These do not appear to affect the structural properties of the foam slab 236 to any extent, however, any more than do the light joint lines 232 of the slab 230.

Figure 16:
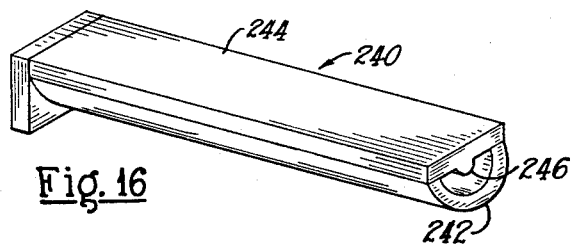
FIG. 16 is a view in perspective of a mold by means of which glass foam bodies for a particular application can be formed.

A mold 240 of FIG. 16 is designed to produce semi-cylindrical pipe insulating sections of foam. The mold 240 includes a semi-cylindrical lower part 242 and a cover 244 which has a ridge 246 extending longitudinally thereof. The ridge forms a recess or groove in the resulting insulating section so that it can receive half of the periphery of a pipe to be insulated. The pipe section is then connected to another section on the opposite side of the pipe to form an insulating layer therearound. The foam batch can be carefully positioned in the mold 240 and foamed therein or it can be made into pellets and combined with a binder such as a plastic material and bentonite, along with asbestos fibers for integrity, to provide an insulating pipe section after the binder is cured or hardened.

Various modifications of the above described embodiments of the invention will be apparent to those skilled in the art and it is to be understood that such modifications can be made without departing from the scope of the invention, if within the spirit and tenor of the accompanying claims.

We claim:

1. The method of making glass foam pellets which comprises crushing a quantity of glass into particles, said glass being made from a batch consisting essentially of from 40–75% $SiO_2$, 0–20% $Al_2O_3$, 5–20% CaO, 0–10% MgO, and 2–15% $B_2O_3$, adding 100 parts of the particles to 0.1 to 10 parts of flake aluminum which is capable of covering at least 10,000 square centimeters of water per gram, 1 to 11 parts of barytes, 0.1 to 8 parts of gypsum, and 0.5 to 2.5 parts of a binder, mixing and grinding the ingredients in a ball mill, adding 10–15% of water to the resulting batch, concurrently with placing the batch on a slanted table, rotating said table while adding the batch and the water thereto to cause said batch to roll into pellets, causing said pellets to roll off the rotating table after reaching a desired size, coating said pellets with talc, heating the pellets in a heated zone maintained at a temperature of 1750–2100° F. for ½ to 2½ minutes, and discharging the foamed pellets from the heated zone.

2. The method of making glass foam pellets which comprises crushing a quantity of glass to a particle size capable of passing through a 14 mesh screen, adding to said glass particles flake aluminum, barium sulphate, and calcium sulphate in quantities sufficient to cause said glass to foam during subsequent heat-treatment, adding a binder to the ingredients, mixing and grinding the ingredients in a ball mill to an extent such that at least 60% of the batch passes through a 170 mesh screen, adding water to the resulting batch concurrently with placing the batch on a slanted table, rotating said table while adding the batch and the water thereon to cause said batch to roll into pellets, and continuing the rotation until the pellets are of a size such that they have diameters of at least 1/64 inch, causing said pellets to roll off the rotating table after reaching a desired size, coating said pellets with a separating agent, heating the pellets in a zone maintained at a temperature of 1750–2100° F. for ½ to 2½ minutes to cause foaming thereof, and discharging the foamed pellets from the heated zone.

3. The method of making glass foam pellets which comprises crushing a quantity of glass which has a viscosity between 1000 and 2,000,000 poises at a temperature between 1750° F. and 2050° F. to a small particle size, adding 100 parts of the particles to 0.1 to 10 parts of flake aluminum, 1 to 11 parts of barium sulphate, 0.1 to 8 parts of calcium sulphate, and a binder, mixing the ingredients in a ball mill sufficiently that at least 60% of the batch passes through a 170 mesh screen, rotating a slanted table while placing the batch and the water thereon to cause said batch to roll into pellets, removing the pellets from the table when they are of a size between 1/64 inch and ¼ inch, coating said pellets with a separating agent, heating said pellets in a furnace to a temperature between 1750 and 2100° F., removing said pellets from the furnace after a period of ½ to 2½ minutes, and cooling said pellets.

4. The method of making glass foam pellets which comprises crushing a quantity of glass which has a viscosity between 40,000 and 2,000,000 poises at 1750° F. and between 1000 and 3000 poises at 2050° F. to a small particle size, adding 100 parts of the particles to 0.1 to 10 parts of flake aluminum, 1 to 11 parts of barium sulphate, 0.1 to 8 parts of calcium sulphate, and a binder, mixing the ingredients in a ball mill sufficiently that at least 60% of the batch passes through a 170 mesh screen, rotating a slanted table while placing the batch and the water thereon to cause said batch to roll into pellets, removing the pellets from the table when they are of a size between 1/64 inch and ¼ inch, coating said pellets with a separating agent, heating said pellets in a furnace to a temperature between 1750 and 2100° F., removing said pellets from the furnace after a period of ½ to 2½ minutes, and cooling said pellets.

5. The method of making glass foam pellets which comprises crushing a quantity of glass which has a viscosity between 10,000 poises and 500,000 poises at a temperature between 1750° F. and 2050° F. to a small particle size, adding 100 parts of the particles to 0.1 to 5 parts of flake aluminum, 2 to 6 parts of barium sulphate, 1 to 3 parts of calcium sulphate, and a binder, mixing the ingredients in a ball mill sufficiently that at least 60% of the batch passes through a 170 mesh screen, supplying water and the resulting batch to a rotating slanted table to cause the batch to roll into pellets, removing the pellets from the table when they are of a size between 1/64 inch and ¼ inch, coating said pellets with a separating agent, heating said pellets in a furnace to a temperature between 1750–2100° F. for a period of from ½ to 2½ minutes, and cooling said pellets.

6. The method of making glass foam pellets which comprises crushing a quantity of glass which has a viscosity between 10,000 poises and 500,000 poises at a temperature between 1750° F. and 2050° F. to a small particle size, adding 100 parts of said particles to 0.1 to 5 parts of flake aluminum, 2 to 6 parts of barium sulphate, 1 to 3 parts of calcium sulphate, and a binder, mixing and grinding the ingredients sufficiently that at least 60% of the batch passes through a 170 mesh screen, adding water to the resulting batch, forming the wet batch into pellets, the largest dimension of each of which is between 1/64 inch and ¼ inch, coating said pellets with a separating agent, heating said pellets to a temperature between 1750–2100° F. for ½ to 2½ minutes, and cooling said pellets.

7. The method of making a glass foam body which comprises mixing 100 parts of glass cullet which has a viscosity between 40,000 and 2,000,000 poises at 1750° F. and between 1000 and 3000 poises at 2050° F. with 0.1 to 10 parts of flake aluminum, 1 to 11 parts of barium sulphate, 0.1 to 8 parts of calcium sulphate, and a binder, adding water to the resulting batch and forming it into a body, heating the body throughout to a temperature between 1750 and 2100° F. to cause said body to foam, and cooling the foamed body.

8. A pipe insulating section made according to the method of claim 7.

9. The method of making a glass foam body which comprises mixing 100 parts of glass which has a viscosity between 10,000 poises and 500,000 poises at a temperature between 1750° F. and 2050° F. with 0.1 to 5 parts of flake aluminum, 2 to 6 parts of barium sulphate, 1 to 3 parts of calcium sulphate, and a binder, adding water to the resulting batch and forming it into a body, heating the body throughout to a temperature between 1750 and 2100° F. to cause said body to foam, and cooling the foamed body.

10. A glass foam batch comprising 100 parts of glass, 0.1 to 5 parts of aluminum in flake form, at least one blowing agent, and a binder.

11. A glass foam batch comprising 100 parts of glass which includes 52–56% $SiO_2$, 12–16% $Al_2O_3$, 16–19% CaO, 3–6% MgO, and 9–11% $B_2O_3$, 0.1 to 5 parts of aluminum in flake form, 2 to 6 parts of barium sulphate, 1 to 3 parts of calcium sulphate, and a binder.

12. A glass foam batch comprising 100 parts of glass which has a viscosity between 1000 and 2,000,000 poises at a temperature between 1750° F. and 2050° F., 0.1 to 5 parts of aluminum in flake form, 2 to 6 parts of barium sulphate, 1 to 3 parts of calcium sulphate, and a binder.

13. A glass foam batch comprising 100 parts of glass which has a viscosity between 10,000 poises and 500,000 poises at a temperature between 1750° F. and 2050° F., 0.1 to 5 parts of aluminum in flake form, 2 to 6 parts of barium sulphate, 1 to 3 parts of calcium sulphate, and a binder.

14. A glass foam batch comprising 100 parts of glass which has a viscosity between 40,000 and 2,000,000 poises at 1750° F. and between 1000 and 3000 poises at 2050° F., 0.1 to 5 parts of aluminum in flake form, 2 to 6 parts of barium sulphate, 1 to 3 parts of calcium sulphate, and a binder.

15. A glass foam batch comprising 100 parts of glass which has a viscosity between 1000 and 2,000,000 poises at a temperature between 1750° F. and 2050° F., 0.1 to 10 parts of aluminum in flake form, 1 to 11 parts of barium sulphate, .1 to 8 parts of calcium sulphate, and a binder.

16. A glass foam batch comprising 100 parts of glass which includes 52–56% $SiO_2$, 12–16% $Al_2O_3$, 16–19% CaO, 3–6% MgO, and 9–11% $B_2O_3$, 0.1 to 10 parts of aluminum in flake form, 1 to 11 parts of barium sulphate, .1 to 8 parts of calcium sulphate, and a binder.

17. A glass foam batch comprising 100 parts of glass which has a viscosity between 10,000 poises and 500,000 poises at a temperature between 1750° F. and 2050° F., 0.1 to 10 parts of aluminum in flake form, 1 to 11 parts of barium sulphate, .1 to 8 parts of calcium sulphate, and a binder.

18. A glass foam batch comprising 100 parts of glass which has a viscosity between 40,000 and 2,000,000 poises at 1750° F. and between 1000 and 3000 poises at 2050° F., 0.1 to 10 parts of aluminum in flake form, 1 to 11 parts of barium sulphate, .1 to 8 parts of calcium sulphate, and a binder.

References Cited by the Examiner
UNITED STATES PATENTS

| | | | |
|---|---|---|---|
| 2,123,536 | 7/38 | Long | 106—40 |
| 2,156,457 | 5/39 | Long | 106—40 |
| 2,514,324 | 7/50 | Ford | 106—40 |
| 2,582,852 | 1/52 | Shoemaker | 106—40 |
| 2,691,248 | 10/54 | Ford | 65—22 |
| 2,948,948 | 8/60 | Duplin et al. | 106—40 |
| 2,983,175 | 5/61 | Harris | 65—22 |

TOBIAS E. LEVOW, *Primary Examiner.*

MAURICE A. BRINDISI, *Examiner.*